United States Patent [19]

Comstock

[11] 4,152,743
[45] May 1, 1979

[54] TRANSIENT VOLTAGE SUPPRESSION SYSTEM

[76] Inventor: Wilford K. Comstock, 8152 S. Danish Rd., Sandy, Utah 84070

[21] Appl. No.: 810,078

[22] Filed: Jun. 27, 1977

[51] Int. Cl.² ............................................. H02H 9/04
[52] U.S. Cl. ...................................... 361/56; 361/111
[58] Field of Search ...................... 361/56, 90, 91, 111, 361/54, 55, 126, 127

[56] References Cited
U.S. PATENT DOCUMENTS

| 3,546,572 | 12/1970 | Specht et al. | 361/56 X |
| 3,660,719 | 5/1972 | Grenier | 361/56 |
| 4,023,071 | 5/1977 | Fussell | 361/111 X |
| 4,068,279 | 1/1978 | Byrnes | 361/56 |

Primary Examiner—Harry E. Moose, Jr.
Attorney, Agent, or Firm—Criddle, Thorpe & Western

[57] ABSTRACT

A transient voltage suppression system for use in an electrical power distribution system which includes at least one power line and a neutral or ground line. The system includes a suppression circuit for each power line of the power distribution system, with each suppression circuit being coupled between a corresponding power line and the neutral or ground line. Each suppression circuit includes a first metal oxide varistor coupled in series with a switching resistor and thermally coupled thereto, and a second metal oxide varistor coupled in parallel with the series connection of the first metal oxide varistor and switching resistor. The breakdown voltage rating of the second metal oxide varistor is greater than that of the first metal oxide varistor. A capacitor is coupled in parallel with the second metal oxide varistor. Coupled between each suppression circuit and a corresponding power line is a fuse for protecting the components of the circuits from current surges.

11 Claims, 2 Drawing Figures

TRANSIENT VOLTAGE SUPPRESSION SYSTEM

BACKGROUND OF THE INVENTION

This invention relates to a transient voltage and current suppression system for use with electrical power systems having at least one power line and one neutral or ground line.

It is desirable to eliminate, to the extent possible, transient voltages in electrical power systems since such voltages may damage electrical apparatus such as motors and household appliances connected to the power systems. In addition, such transient voltages may cause the electrical apparatus to overheat so that it operates less efficiently and thus at a greater cost to the user.

Transient voltages are produced in electrical circuits by such events as relay switching, motor commutator cycling, contact arching, and in generally any repititious on/off cycling events. Also, transient voltages may be caused by atmospheric events such as lightening and this type of transient voltage is especially destructive to electrical apparatus.

Transient voltage suppression is generally achieved with the use of various types of voltage clamping devices which are coupled either between the power lines of a system, between the power lines and a neutral or ground line, or both. When the voltage on a power line exceeds some predetermined level, the voltage clamping device becomes conductive to thereby "clamp" or maintain the voltage on the line at or below the predetermined level. In this manner, electrical apparatus connected to the power system is protected.

Because most voltage clamping devices have certain operating characteristics and limitations, if excessive current or voltage surges occur, it is possible that the clamping devices will be damaged so that they cannot perform their protective function. Typically, voltage clamping devices which have low breakdown voltage ratings cannot withstand excessive transient voltages or currents, whereas voltage clamping devices having high breakdown voltage ratings can withstand such voltages or currents. Thus, on the one hand it would appear desirable to select voltage clamping devices having high breakdown voltage ratings simply because such devices would be less likely to be damaged, but on the other hand it is desirable to "clamp" transient voltages at lower levels than can be achieved with the higher rated devices. Of course, it would be desirable to provide some type of voltage suppression arrangement which could "clamp" the voltage on power lines at some selected level without exposing the voltage clamping devices to damage from high transient voltages or currents.

SUMMARY OF THE INVENTION

It is an object of the present invention to provide a new and useful transient voltage and current suppression system for use in single phase or multiphase electrical power systems.

It is another object of the present invention to provide such a system which utilizes voltage clamping devices and switching resistors in such a way as to protect the voltage clamping devices themselves from excessive voltage or current surges.

The above and other objects of the invention are realized in an illustrative embodiment of a transient of a transient voltage suppression system adapted for use in an electrical power system having at least one power line and one neutral or ground line. The transient voltage suppression system includes a first voltage clamping device having a certain breakdown voltage rating, a switching resistor connected in series with the first voltage clamping device and thermally coupled thereto, and a second voltage clamping device coupled in parallel with the series connection of the first voltage clamping device and the switching resistor. The second voltage clamping device has a breakdown voltage rating which is higher than the rating of the first device. When a transient voltage on the power line exceeds the rating of the first device, the device is caused to conduct to thereby "clamp" the voltage on the power line. If the transient voltage which causes the first device to conduct increases, the temperature of the device also increases and when a certain temperature level is reached, the switching resistor thermally coupled to the first device becomes substantially non-conductive so that no further transient voltage or current can be applied to the first device. If the transient voltage exceeds the breakdown voltage rating of the second device then that device is caused to conduct to thus "clamp" the transient voltage at a level above the level of the first device. In this manner, the first device is protected from excessively high transient voltages and currents which, nevertheless, may be "clamped" by the second device.

For additional power lines of a power distribution system, circuit combinations similar to that described above can be coupled between each additional power line and the neutral or ground line. To provide additional protection to such circuit combinations, fuses may be coupled between each circuit combination and the respective power line to protect the circuit components from excessive current surges.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
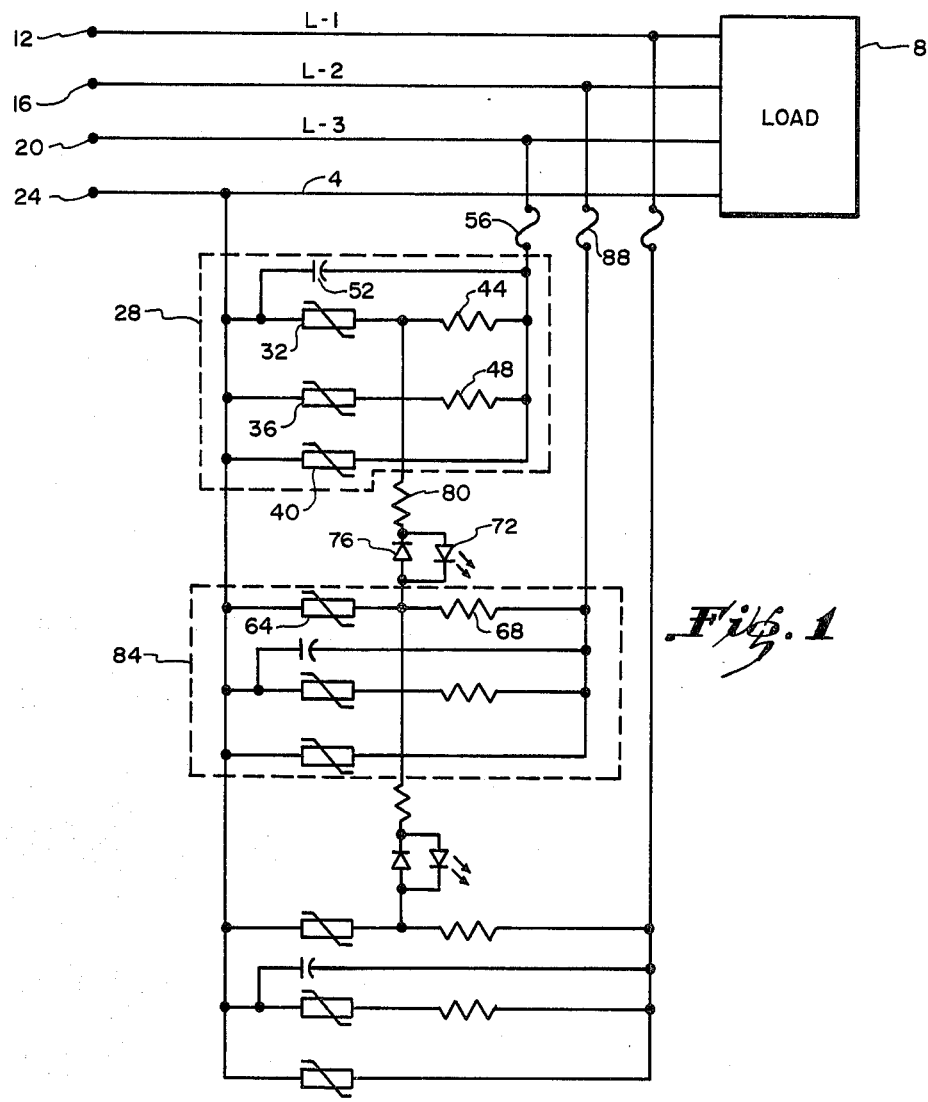
FIG. 1 shows an illustrative embodiment of the present invention coupled into what could be either a three phase, three wire electrical power system or a three phase, four wire power system.

The embodiment of the invention shown in FIG. 1 may be used with a so-called delta arrangement, three phase, three wire power distribution system which includes three power lines L-1, L-2, and L-3, one of which carries a higher voltage than the others, and a ground conductor 4. The embodiment could also be used with a Y arrangement, three phase, four wire power distribution system in which line 4 would be a neutral or return line and the power lines L-1, L-2 and L-3 would all carry the same voltage.

The power lines L-1, L-2 and L-3 and the line 4 are all coupled to a load 8 which could be any type of conventional, residential or industrial electrical apparatus for which transient voltage protection is desired. Terminals 12, 16, 20 and 24 of the lines would be connected to either the aforementioned delta arrangement power distribution system or Y arrangement power distribution system.

Coupled between each power line and the neutral or ground line 4 is a voltage suppression circuit for suppressing or clipping transient voltages and currents present on either the corresponding power lines or the neutral or ground line. Only the voltage suppression circuit shown within dotted line 28 and coupled between power line L-3 and the neutral or ground line 4 will be described in detail, but it should be understood that the other voltage suppression circuits operate in a similar fashion. The voltage suppression circuit 28 includes three metal oxide varistors 32, 36 and 40, two of which are coupled in series with switching resistors 44 and 48. The series connections of the metal oxide varistors and switching resistors are coupled in parallel with each other and with the metal oxide varistor 40. A capacitor 52 is also coupled in parallel with the metal oxide varistor 40. Finally, the voltage suppression circuit 28 is coupled in series with a fuse 56 between the power line L-3 and the neutral or ground line 4.

The metal oxide varistors serve as voltage clamping devices by becoming conductive when voltage applied thereto exceeds a certain level. The level at which a metal oxide varistor becomes conductive is determined by the so-called breakdown voltage rating of the device and the metal oxide varistors 32, 36 and 40 each have different breakdown voltage ratings. The metal oxide varistor 32 has the lowest breakdown voltage rating, for example, 120 volts, whereas the metal oxide varistor 40 has a much higher breakdown voltage rating, for example, 1900 volts. The metal oxide varistor 36 has a breakdown voltage rating between that of the varistor 32 and the varistor 40, for example, 800 volts.

The switching resistors 44 and 48 operate as conductors when the current therethrough or the temperature thereof are below certain levels. When the current exceeds a certain level or when the temperature exceeds a certain level, then the switching resistors become essentially nonconductive. Connecting the switching resistors 44 and 48 in series with respective metal oxide varistors 32 and 36 serve to protect the varistors from transient voltages which might otherwise damage the varistors.

Figure 2:
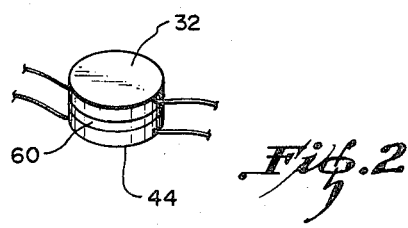
FIG. 2 shows an exemplary metal oxide varistor thermally coupled to a switching resistor.

This protection is accomplished by thermally coupling each switching resistor to its corresponding metal oxide varistor in a manner such as that illustrated in FIG. 2. There, the metal oxide varistor 32, which is in the form of a circular wafer, is positioned on top of the switching resistor 44, which is also in the form of a circular wafer, with conventional solder 60 thermally joining the two elements together. With this arrangement, when the metal oxide varistor is made conductive by transient voltage which exceeds the breakdown voltage level of the varistor, the varistor heats to a temperature generally proportional to the applied voltage. If the applied voltage is high, then the temperature produced in the varistor will be high, etc. As explained earlier, the switching resistor 44 is temperature responsive (and current responsive) so that when a certain temperature is reached (or a certain current level), the switching resistor becomes nonconductive. The switching resistor 44 is selected to become nonconductive at a temperature produced by the metal oxide varistor 32 at which the corresponding transient voltage is just below that level which would cause damage to the varistor. In other words, when the transient voltage applied to the metal oxide varistor 32 reaches a certain level which, in turn, causes the temperature of the varistor to increase to a certain level, the switching resistor 44 becomes nonconductive so that any further increase in the transient voltage will not affect the metal oxide varistor 32 since the voltage will not be applied to the varistor. The switching resistor might illustratively be a so-called PTC such as produced by Mepco, Inc., or other suitable thermistor-type device which will become non-conductive at certain temperature levels.

In operation, the metal oxide varistor 32 will clip or "clamp" transient voltages which are above the breakdown voltage rating of the varistor and below the level at which the switching resistor 44 is caused to become nonconductive. Advantageously, at the last-mentioned level, the metal oxide varistor 36 would become conductive to clamp any transient voltage above that level and up to a level at which the corresponding switching resistor 48 would become nonconductive. Above the level at which the switching resistor 48 is nonconductive, then advantageously, metal oxide varistor 40 would become conductive to clamp the voltage above that level. Thus, each metal oxide varistor will operate to clamp transient voltages which exceed a certain level but which are below another level which might cause damage to the varistors. When one metal oxide varistor is "removed" from functioning in the circuit by the corresponding switching resistor becoming nonconductive, then the next higher rated metal oxide varistor takes over, etc. In this manner, fairly low level transient voltages can be clipped as well as higher level transient voltages and the metal oxide varistors are protected from voltages and currents which might otherwise damage them.

The capacitor 52 is provided to filter or clip radio frequency interference (rfi) signals on the power line L-3 which are not high enough to trigger any of the metal oxide varistors. The fuse 56 is provided to protect the metal oxide varistors and in particular the metal oxide varistor 40 from excessive current surges which might otherwise damage the varistor. This fuse is a conventional fuse which ruptures or "blows" when subject to an excessive current surge.

Coupled between the junction of metal oxide varistor 32 and switching resistor 44 and the junction between a metal oxide varistor 64 and a switching resistor 68 of voltage suppression circuit 84 are a light-emitting diode 72 and a conventional diode 76 which are connected in parallel with each other but in opposite directions. Coupled in series with the diodes 72 and 76 is a resistor 80. The light-emitting diode 72 is adapted to emit visible light when current is conducted therethrough from the voltage suppression circuit 28 to voltage suppression circuit 84. The diode 76 is provided to conduct current and thus prevent damage to the light-emitting diode 72 if, for example, a back emf is produced by the load 8. The resistor 80 is provided to limit the current flowing through the diodes.

Provision of the light-emitting diode enables rapid visual determination of whether or not one of the fuses coupled to the voltage suppression circuits has blown since, under normal operating conditions, some current would flow, for example, from power line L-3 through the fuse 56 and switching resistor 44, through the resistor 80 and light-emitting diode 72 and then through switching resistor 68 back to power line L-2. With current flowing through the light-emitting diode 72, the diode would give off light indicating that at least fuse 56 is intact. If fuse 56 ruptured, for example, then no current would flow through the light-emitting diode 72 indicating that the fuse had blown. Replacement of the fuse could then be made and the circuit would again function properly. A light-emitting diode is also coupled between voltage suppression circuit 84 and the remaining voltage suppression circuit in the system for the reasons described above for light-emitting diode 72.

The system of the present invention may also be utilized with either single phase, two wire electrical power systems or single phase, three wire power systems. In such cases, a voltage suppression circuit such as circuit 28 or 84 would be connected between each power line of the power distribution system and the neutral or return line in the manner shown in FIG. 1. In the case of the single phase, three wire power system, two voltage suppression circuits would be utilized and would be coupled together by a resistor, a light-emitting diode and a standard diode similar to that shown in FIG. 1.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. For use in an electrical power system having at least one power line and one neutral or ground line, a transient signal suppression system comprising:
    a first voltage clamping device having a first breakdown voltage rating,
    a switching resistance means thermally coupled to said first voltage clamping device and operable to become substantially nonconductive at a certain threshold temperature,
    means for coupling the first voltage clamping device and switching resistance means in series between the power line and neutral line with said switching resistance means being connected to the power line, and
    a second voltage clamping device coupled in parallel with the series connections of the first voltage clamping device and switching resistance means, said second voltage clamping device having a second breakdown voltage rating which is higher than said first rating.

2. A system as in claim 1 further comprising capacitance means coupled in parallel with said second voltage clamping device.

3. A system as in claim 2 further comprising:
    a third voltage clamping device having a breakdown voltage rating which is higher than said first rating and lower than said second rating,
    a second switching resistance means thermally coupled to said third voltage clamping device, and
    means for coupling the third voltage clamping device and second switching resistance means in series between the power line and neutral line, with the second switching resistance means being connected to the power line.

4. A system as in claim 3 wherein the voltage clamping means comprise metal oxide varistors.

5. A system as in claim 4 wherein the switching resistance means comprise:
    PTC devices.

6. In an electrical power distribution system which includes at least two power lines and a neutral or ground line, a voltage suppression system comprising:
    a first voltage suppression circuit coupled between one of the power lines and the neutral line,
    a second voltage suppression circuit coupled between the other of the power lines and the neutral line, and
    wherein each of said voltage suppression circuits includes:
        a first voltage clamping means having a first breakdown voltage rating,
        a switching resistance means coupled in series with said first voltage clamping means and thermally coupled to said first voltage clamping means, said switching resistance means being operable to become substantially nonconductive at a certain threshold temperature therein or current therethrough, and
        a second voltage clamping means coupled in parallel with the series connection of said first voltage clamping means and said switching resistance means, said second voltage clamping means having a second breakdown voltage rating which is higher than said first rating.

7. A system as in claim 6 wherein each of said voltage suppression circuits further includes a capacitor coupled in parallel with the second voltage clamping means.

8. A system as in claim 7 further including:
    a first fuse means coupled between said first voltage suppression circuit and said one of the power lines, and
    a second fuse means coupled between said second voltage suppression circuit and said other of the power lines.

9. A system as in claim 8 further comprising light-emitting means and resistance means coupled in series between the junction of the first voltage clamping means and first switching resistance means of the first voltage suppression circuit and the junction of the first voltage clamping means and first switching resistance means of the second voltage suppression circuit.

10. A system as in claim 9 which said light-emitting means comprises a light-emitting diode, said system further comprising a second diode coupled in parallel with the light-emitting diode, but in opposite direction.

11. A system as in claim 7 wherein each of said voltage suppression circuits further includes:
    a third voltage clamping means having a breakdown voltage rating which is higher than said first rating and lower than said second rating,
    a second switching resistance means coupled in series with said third voltage clamping means and thermally coupled to said third voltage clamping means, and
    means for coupling the series connection of said third voltage clamping means and second switching resistance means in parallel with said second voltage clamping means.

* * * * *